(12) United States Patent
Bharti et al.

(10) Patent No.: US 10,564,934 B2
(45) Date of Patent: *Feb. 18, 2020

(54) HARDWARE DEVICE BASED SOFTWARE VERIFICATION

(71) Applicant: INTERNATIONAL BUSINESS MACHINES CORPORATION, Armonk, NY (US)

(72) Inventors: Harish Bharti, Pune (IN); Rajesh K. Saxena, Thane East (IN); Balakrishnan Sreenivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,548

(22) Filed: Sep. 6, 2018

(65) Prior Publication Data
US 2019/0004771 A1 Jan. 3, 2019

Related U.S. Application Data

(63) Continuation of application No. 15/472,991, filed on Mar. 29, 2017, now Pat. No. 10,101,971.

(51) Int. Cl.
G06F 9/44 (2018.01)
G06F 8/20 (2018.01)

(52) U.S. Cl.
CPC ..................... *G06F 8/20* (2013.01)

(58) Field of Classification Search
None
See application file for complete search history.

(56) References Cited

U.S. PATENT DOCUMENTS 7,117,351 B2 10/2006 O'Connor
7,657,542 B2 2/2010 Sundararajan
(Continued)

FOREIGN PATENT DOCUMENTS

JP 2011197799 10/2011

OTHER PUBLICATIONS

Friedman, Mark J.; Updated List of IBM Patents or Patent Applications Treated as Related; Jan. 9, 2019; 1 page.
(Continued)

*Primary Examiner* — Insun Kang
(74) *Attorney, Agent, or Firm* — Schmeiser, Olsen & Watts; Mark C. Vallone

(57) ABSTRACT

A method and system for improving an operation of an automated IT system is provided. The method includes identifying pre-tested software applications associated with requirements of processes executed by a hardware device with respect to an IT system. A list of available software applications associated with required features is generated and each feature is defined such that the currently available software applications are configured to provide and execute the required features. Evaluation code is executed and a resulting a list of validated software applications is generated. A list of short listed software applications and identification software code enabling an automated encoder learning process are generated. A software operational solution is identified and modification code is generated and executed code resulting in improved operation of the validated software applications and the hardware device.

20 Claims, 8 Drawing Sheets

(56) References Cited

U.S. PATENT DOCUMENTS

| | | | |
|---|---|---|---|
| 8,347,267 | B2 | 1/2013 | Givoni et al. |
| 8,639,487 | B1 | 1/2014 | Ezer |
| 8,719,776 | B2 | 5/2014 | Eteminan |
| 8,799,436 | B2 | 8/2014 | Ayachitula |
| 8,875,091 | B1 | 10/2014 | Rouleau |
| 9,009,193 | B2 | 4/2015 | Callery et al. |
| 9,009,694 | B2 | 4/2015 | Dirico |
| 9,032,373 | B1 | 5/2015 | Gupta |
| 9,473,931 | B2 | 10/2016 | Payyappilly |
| 9,720,799 | B1 | 8/2017 | Lachwani |
| 9,742,619 | B2 | 8/2017 | Andreev |
| 10,042,614 | B1 | 8/2018 | Bharti |
| 10,101,971 | B1 | 10/2018 | Bharti |
| 2006/0150143 | A1 | 7/2006 | Andreev |
| 2006/0156274 | A1 | 7/2006 | Andreev |
| 2007/0300204 | A1 | 12/2007 | Andreev |
| 2009/0119545 | A1 | 5/2009 | Pham |
| 2009/0124241 | A1 | 5/2009 | Krishnaswamy |
| 2009/0307660 | A1 | 12/2009 | Srinivasan |
| 2010/0031247 | A1 | 2/2010 | Arnold |
| 2010/0131928 | A1 | 5/2010 | Parthasarathy |
| 2011/0099532 | A1 | 4/2011 | Coldicott |
| 2011/0107327 | A1 | 5/2011 | Barkie |
| 2011/0154317 | A1 | 6/2011 | Madduri |
| 2011/0166849 | A1 | 7/2011 | Dube |
| 2012/0180027 | A1 | 7/2012 | Yu |
| 2012/0246612 | A1 | 9/2012 | Ji |
| 2013/0247022 | A1 | 9/2013 | Dejana |
| 2013/0346260 | A1* | 12/2013 | Jubran ................ G06Q 10/087 705/28 |
| 2014/0007070 | A1 | 1/2014 | Huang |
| 2015/0007149 | A1 | 1/2015 | Maddela |
| 2015/0033208 | A1 | 1/2015 | Krishna |
| 2015/0066563 | A1 | 3/2015 | McLees |
| 2015/0339111 | A1* | 11/2015 | Kedia ................ G06F 8/61 717/176 |
| 2015/0363196 | A1 | 12/2015 | Carback, III et al. |
| 2016/0019132 | A1* | 1/2016 | Vilakkumadathil .. G06F 16/254 717/126 |
| 2016/0147518 | A1 | 5/2016 | Dimitrakos |
| 2016/0188130 | A1* | 6/2016 | Harris ................ H04L 67/34 715/738 |
| 2018/0196731 | A1* | 7/2018 | Moorthi ................ G06F 11/368 |
| 2018/0285080 | A1 | 10/2018 | Bharti |
| 2018/0285081 | A1 | 10/2018 | Bharti |
| 2018/0285763 | A1 | 10/2018 | Bharti |

OTHER PUBLICATIONS

Bandor, Michael S.; Quantitative Methods for Software Selection and Evaluation; Carnegie Mellon University Technical Note, Acquisition Support Program; Sep. 2006; 23 pages.

Friedman, Mark J.; List of IBM Patents or Patent Applications Treated as Related; Sep. 5, 2018; 1 page.

Li, Yan et al.; A Multiple Criteria Decision Analysis (MCDA) Software Selection Framework; 2014 47th Hawaii International Conference on System Science; Jan. 6-9, 2014; pp. 1084-1094.

Lin, Han et al.; COTS Software Selection Process; Sandia National Laboratories; May 2006; 24 pages.

Queenette, Udoh-llomechine et al.; Selection Criteria for Computer Software and Hardware: A Case Study of Six University Libraries in Nigeria; Chinese Librarianship: an International Electronic Journal, 32; Aug. 17, 2011; 9 pages.

Rogers, Kishau; 20 Criteria for Selecting Business Software; Websmith Group; Nov. 23, 2011; URL: http://www.websmithgroup.com/blog/business/criteria-forselecting-businesssoftware/; 4 pages.

* cited by examiner

| FEATURES | SCORE BASED ON CLASSIFICATION | HIGHEST FITMENT SOFTWARE APPLICATION |
|---|---|---|
| F1 | 87 | SA7 |
| F2 | 92 | SA5 |
| F3 | 95 | SA7 |
| F4 | 99 | SA3 |
| F5 | 89 | SA10 |
| F6 | 90 | SA9 |
| F7 | 96 | SA6 |

FIG. 7

HARDWARE DEVICE BASED SOFTWARE VERIFICATION

CROSS REFERENCE TO RELATED APPLICATIONS

This application is a continuation application claiming priority to Ser. No. 15/472,991 filed Mar. 29, 2017, the contents of which are hereby incorporated by reference.

FIELD

The present invention relates generally to a method for validating software applications and in particular to a method and associated system for improving software technology associated with an operation of a hardware device via generation and execution of software code for modifying software code and associated hardware devices.

BACKGROUND

Accurately validating instructions for operating a device typically includes an inaccurate process with little flexibility. Determining system operational solutions with respect to code may include a complicated process that may be time consuming and require a large amount of resources. Accordingly, there exists a need in the art to overcome at least some of the deficiencies and limitations described herein above.

SUMMARY

A first aspect of the invention provides an automated IT system operational improvement method comprising: identifying, by a processor of a hardware device of an IT system, a set of pre-tested software applications associated with requirements of processes executed by the hardware device with respect to the IT system, wherein the requirements are comprised by metadata, and wherein the set of pre-tested software applications have been pre-tested for accurate functionality with respect to performing the processes executed by the hardware device with respect to the IT system; generating, by the processor based on results of the identifying, a list of currently available software applications of the set of pre-tested software applications associated with required features associated with software based solutions for modifying the set of pre-tested software applications such that the currently available software applications are configured to provide and execute the required features; defining, by the processor based on results of the generating, each required feature of the required features; generating, by the processor based on the software based solutions, evaluation code for evaluating the currently available software applications with respect to associations between each the required feature and a plurality of hardware based data repositories; generating, by the processor based on results of executing the evaluation code, a list of validated software applications of the currently available software applications, the validated software applications associated with each the required feature being executed by applying Euclidean distance software code; generating, by the processor based on results of the executing the evaluation code, a list of short listed software applications of the currently available software applications, the short listed software applications have been verified via a sampling software test determined by feature translation learning code associated with each the required feature being executed; generating, by the processor, identification software code enabling an automated encoder learning process applying a feature learning technique for identifying the validated software applications; identifying, by the processor, a software operational solution of the software based solutions, the software operational solution comprising all available features of the required features associated with the validated software applications and comprising a greater number of features than any other software application of the validated software applications; generating, by the processor based on the software operational solution, modification code for modifying the validated software applications; and executing, by the processor, the modification code resulting in improved operation of the validated software applications and the hardware device.

A second aspect of the invention provides a computer program product, comprising a computer readable hardware storage device storing a computer readable program code, the computer readable program code comprising an algorithm that when executed by a processor of a hardware device of an IT system implements an automated IT system operational improvement method, the method comprising: identifying, by the processor, a set of pre-tested software applications associated with requirements of processes executed by the hardware device with respect to the IT system, wherein the requirements are comprised by metadata, and wherein the set of pre-tested software applications have been pre-tested for accurate functionality with respect to performing the processes executed by the hardware device with respect to the IT system; generating, by the processor based on results of the identifying, a list of currently available software applications of the set of pre-tested software applications associated with required features associated with software based solutions for modifying the set of pre-tested software applications such that the currently available software applications are configured to provide and execute the required features; defining, by the processor based on results of the generating, each required feature of the required features; generating, by the processor based on the software based solutions, evaluation code for evaluating the currently available software applications with respect to associations between each the required feature and a plurality of hardware based data repositories; generating, by the processor based on results of executing the evaluation code, a list of validated software applications of the currently available software applications, the validated software applications associated with each the required feature being executed by applying Euclidean distance software code; generating, by the processor based on results of the executing the evaluation code, a list of short listed software applications of the currently available software applications, the short listed software applications have been verified via a sampling software test determined by feature translation learning code associated with each the required feature being executed; generating, by the processor, identification software code enabling an automated encoder learning process applying a feature learning technique for identifying the validated software applications; identifying, by the processor, a software operational solution of the software based solutions, the software operational solution comprising all available features of the required features associated with the validated software applications and comprising a greater number of features than any other software application of the validated software applications; generating, by the processor based on the software operational solution, modification code for modifying the validated software applications; and executing, by the processor, the modification code resulting in improved operation of the validated software applications and the hardware device.

A third aspect of the invention provides a hardware device of an IT system comprising a processor coupled to a computer-readable memory unit, the memory unit comprising instructions that when executed by the computer processor implements an automated IT system operational improvement method comprising: identifying, by the processor, a set of pre-tested software applications associated with requirements of processes executed by the hardware device with respect to the IT system, wherein the requirements are comprised by metadata, and wherein the set of pre-tested software applications have been pre-tested for accurate functionality with respect to performing the processes executed by the hardware device with respect to the IT system; generating, by the processor based on results of the identifying, a list of currently available software applications of the set of pre-tested software applications associated with required features associated with software based solutions for modifying the set of pre-tested software applications such that the currently available software applications are configured to provide and execute the required features; defining, by the processor based on results of the generating, each required feature of the required features; generating, by the processor based on the software based solutions, evaluation code for evaluating the currently available software applications with respect to associations between each the required feature and a plurality of hardware based data repositories; generating, by the processor based on results of executing the evaluation code, a list of validated software applications of the currently available software applications, the validated software applications associated with each the required feature being executed by applying Euclidean distance software code; generating, by the processor based on results of the executing the evaluation code, a list of short listed software applications of the currently available software applications, the short listed software applications have been verified via a sampling software test determined by feature translation learning code associated with each the required feature being executed; generating, by the processor, identification software code enabling an automated encoder learning process applying a feature learning technique for identifying the validated software applications; identifying, by the processor, a software operational solution of the software based solutions, the software operational solution comprising all available features of the required features associated with the validated software applications and comprising a greater number of features than any other software application of the validated software applications; generating, by the processor based on the software operational solution, modification code for modifying the validated software applications; and executing, by the processor, the modification code resulting in improved operation of the validated software applications and the hardware device.

The present invention advantageously provides a simple method and associated system capable of accurately validating instructions for operating a device.

BRIEF DESCRIPTION OF THE DRAWINGS

FIG. 7 illustrates execution of a step of FIG. 2 for generating software operational solution 700, in accordance with embodiments of the present invention.

DETAILED DESCRIPTION

Figure 1:
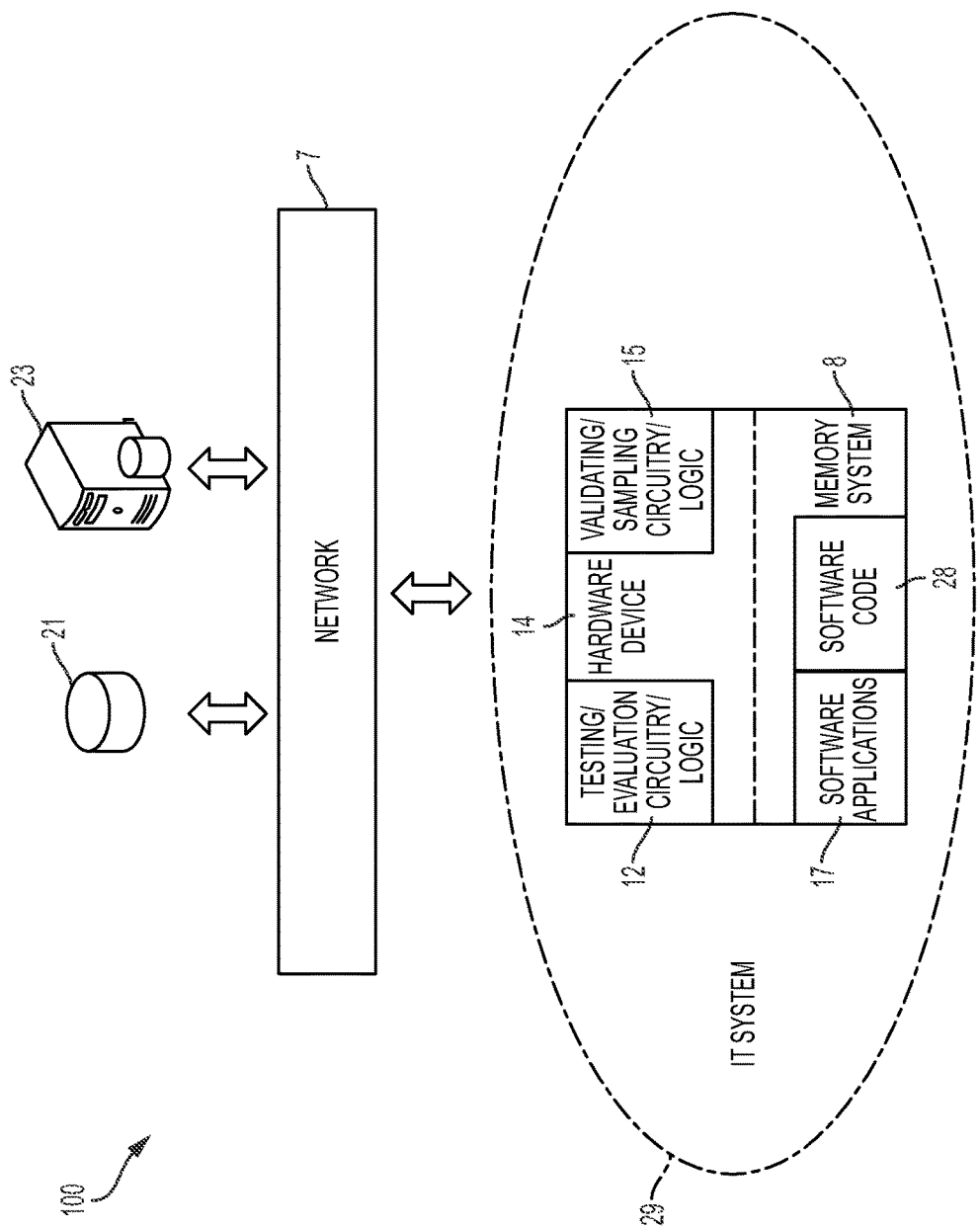
FIG. 1 illustrates a system for improving hardware device operation by generating evaluation and modification software code for validating software applications and a hardware device, in accordance with embodiments of the present invention.

FIG. 1 illustrates a system 100 for improving hardware device operation by generating evaluation and modification software code for validating software applications and a hardware device 14, in accordance with embodiments of the present invention. System 100 enables a process for improving hardware/software technology by enabling an automated encoder for applying a feature learning technique for identifying and modifying validated software applications. System 100 is enabled to automatically select software for an operational improvement project by mapping software/hardware requirements to IT system frameworks determining associated capabilities and processes. System 100 enables a process for selecting a software application executing code for implementing best depth capabilities of a software project by identifying requirements and use cases of a software project that are associated with selected software offerings. System 100 executes code for calculating a depth fit score (for each selected software application) for evaluating a depth of the selected software application by classifying operational features via usage of an unsupervised feature translation learning and characteristic classification hardware framework. Additionally, system 100 enables a depth criteria adjustment process for selecting software for absorbing modifications in a depth fit for modifying and utilizing syndication software with respect to a trained data set configured to accurately evaluate a depth fit of features for each software application.

System 100 of FIG. 1 includes a server 23 and a database system 21 connected through a network 7 to an IT system comprising a hardware device 14. IT system 29 may comprise a plurality of hardware devices (similar to hardware device 14) and/or any type of IT type of device. Hardware device 14 comprises testing/evaluation circuitry/logic 12, validation/sampling circuitry/logic 15, and a memory system. Memory system comprises software applications 17 and software code 28. Server 23, database system 21, and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 23, database system 21, and hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-3. The specialized discrete non-generic analog, digital, and logic based circuitry (e.g., testing/evaluation circuitry/logic 12, validating/sampling circuitry/logic 15, etc.) may include proprietary specially designed components (e.g., a specialized integrated circuit, such as for example an Application Specific Integrated Circuit (ASIC) designed for only implementing an automated process improving hardware device operation by generating evaluation and modification software code for validating software applications and a hardware device 14. Hardware device 14 includes memory system 8 comprising software applications 17 and software code 28. The memory system 8 may include a single memory system. Alternatively, the memory system 8 may include a plurality of memory systems. Network 7 may include any type of network including, inter alia, a local area network, (LAN), a wide area network (WAN), the Internet, a wireless network, etc.

System 100 enables a process for determining pretested software applications (i.e., pretested for accurate functionality with respect to performing processes executed by hardware device 14 with respect to IT system 29) and associated software platforms required to fulfill a given set of hardware/software based operational requirements (i.e., functional and non-functional requirements). System 100 comprises an automated IT system operational improvement method for identifying available software applications associated with operational requirements of processes executed by hardware device 14 with respect to IT system 29. System 100 provides a hardware framework for cognitively identifying software based solutions that include all available features associated with validated software applications and executing modification code resulting in improved operation of the validated software applications and hardware device 14.

System 100 enables:

A process for combining software code into software/hardware operational solution requirements for automatically enabling hardware architecture to recursively generate modified framework based model generation code. The modified framework based model generation code executes decision based circuitry for generating a decision model and associated hardware/software for ensuring that all identified operational requirements and are associated with specified software applications thereby generating robust hardware and software systems. The decision model and associated hardware/software provides a mechanism for calculating a fit score for each software application for executing depth fit assortment circuitry thereby enabling a feature translation learning circuit and associated characteristic classification framework for classifying operational features for a depth based operational evaluation. Additionally, the decision model and associated hardware/software enables a process for fine tuning all operational attributes of the IT system. A meta model may be generated for evaluating software/hardware based parameters including, inter alia, a software/hardware provider, references, a specified geography, non-functional requirements, etc. Meta data retrieved from the meta models enables a process for extracting of the meta data from various associated databases. System 100 executes an accurate hardware/software mechanism for fine tuning weights for various target hardware/software selection framework parameters for each client by employing a syndication guided software sampling strategy and unsupervised feature learning processes with respect to identified target software solution options. The meta model allows for combining sentiment inputs for applicable software based parameters from networking Websites by providing the ability to include broader software attributes for scoring individual parameters for a software/hardware offering selection process.

Figure 2:
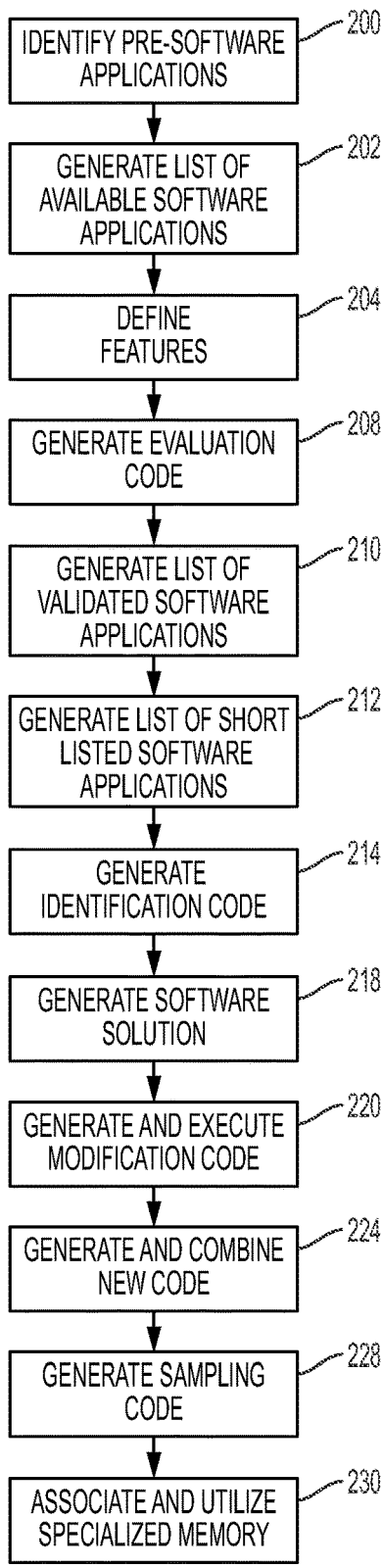
FIG. 2 illustrates an algorithm detailing a process flow enabled by system 100 of FIG. 1 for improving hardware device operation by generating evaluation and modification software code for validating software applications and a hardware device, in accordance with embodiments of the present invention.

FIG. 2 illustrates an algorithm detailing a process flow enabled by system 100 of FIG. 1 for improving hardware device operation by generating evaluation and modification software code for validating software applications and a hardware device, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server 23, database system 21, and/or hardware device 14 of FIG. 1. In step 200, a set of pre-tested software applications associated with requirements of processes executed by a hardware device with respect to an IT system are identified. The requirements are comprised by metadata. The set of pre-tested software applications have been pre-tested for accurate functionality with respect to performing the processes executed by the hardware device with respect to the IT system. In step 202, a list of currently available software applications of the set of pre-tested software applications is generated. The list includes required features associated with software based solutions for modifying the set of pre-tested software applications such that the currently available software applications are configured to provide and execute the required features. In step 204, each required feature is defined based on results of step 202. In step 208, evaluation code for evaluating the currently available software applications with respect to associations between each required feature and a plurality of hardware based data repositories is generated based on the software based solutions. In step 210, a list of validated software applications associated with each required feature being executed by applying Euclidean distance software code is generated. In step 212, a list of short listed software applications (of the currently available software applications is generated based on results execution of the evaluation code. The short listed software applications have been verified via a sampling software test determined by feature translation learning code associated with each d required feature being executed. In step 214, identification software code is generated. The identification software code enables an automated encoder learning process that applies a feature learning technique for identifying the validated software applications. In step 218, a software operational solution (of the software based solutions) is generated. The software operational solution includes: all available features of the required features associated with the validated software applications and a greater number of features than any other software application of the validated software applications. In step 220, modification code for modifying the validated software applications is generated (based on the software operational solution) and executed resulting in improved operation of the validated software applications and hardware device. Improved operation of the validated software applications and hardware device may include, inter alia, an improved processing speed for a processor, an improved memory structure of the hardware device, etc. An improved memory structure enables an improved access speed for accessing data within the improved memory structure via an internal layered structure of the improved memory structure. In step 224, executable code associated with the software operational solution is generated and executed resulting in modification of the validated software applications with respect to improving an efficiency and accuracy of the validated software applications. Additionally, additional executable code is generated in response to executing the executable code. The additional executable is combined with the validated software applications resulting in improving efficiency and accuracy of the validated software applications. In step 228, sampling software code is generated by applying a sampling technique for enabling the hardware device to execute self learning software code with respect to a plurality of database systems based on software based solutions. In step 230, the validated software applications are associated to differing dimensions of specialized memory devices and/or structures.

Figure 3:
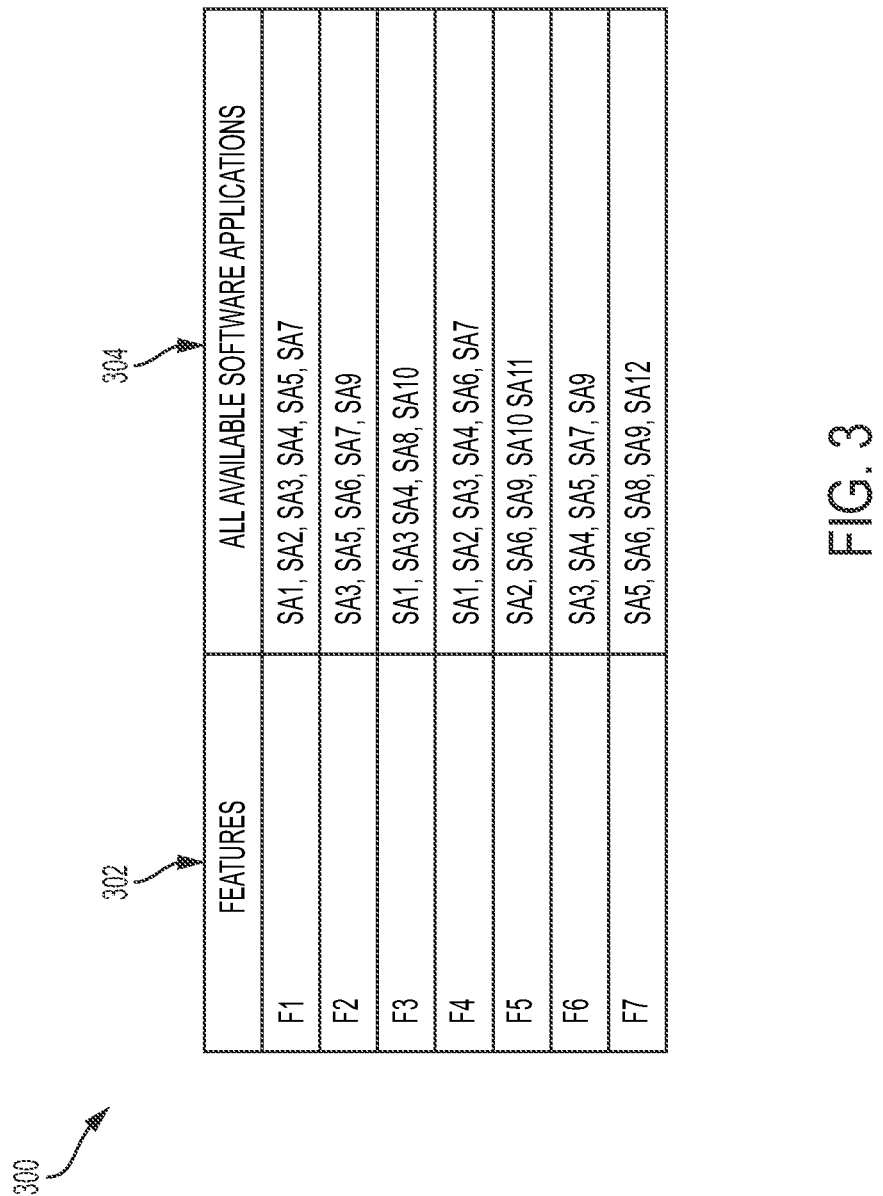
FIG. 3 illustrates execution of a step of FIG. 2 for generating a list of currently available software applications of the set of pre-tested software applications is generated, in accordance with embodiments of the present invention

FIG. 3 illustrates execution of step 202 of FIG. 2 for generating a list of currently available software applications of the set of pre-tested software applications, in accordance with embodiments of the present invention. Execution of step 202 results in the generation of a mapping table 300 for mapping software features 302 to software applications 304. The list of currently available software applications such that each software feature is defined and commonly used software applications are identified. The mapping table is generated by selecting mapping functions as follows:

An entire set of functional area hardware/software components is represented by a set $\{F\}$. Additionally, since set $\{F\}$ represents the set of all functional components, set $\{F\}$ may include a subset or a proper set of a component functional schematic as follows: If, C comprises a number of hardware/software component functions in the functional schematic, then the following equation is generated:

$$\{F\} \leftarrow \{F_c | \forall F_i \in \{CBM\} :: i < C\}$$

Additionally, set $\{P\}$ represents a set of all software products such that $P_\alpha$ comprises a subset of $\{P\}$ defined as follows:

$$\{P_\beta\} \leftarrow \{P_{\beta i} | \forall P_i \in \{P\} :: \beta = |P_j :: [j] = |F|; [j] = 1|\}$$

Therefore, an ordered set that has been fitted for width may be executed such that a software selection process may be implemented with respect to the following assortment:

$$\{(P_\beta)\} \leftarrow \{P_{sorted} \cap F_c :: \exists P \neq \{\emptyset\}, (P_i > P_{i-1} | \forall P_i \in P)\}$$

Additionally, each dimension of P may be defined as a functional or non-functional dimension being captured in a set $\{C\} \leftarrow \{$set of all categories$\}$, such that:

$$\{C\} \leftarrow \{C_c | \forall C_i \in \{\text{dimensions}\} :: i < C\}$$

The aforementioned mapping table generation process allows for the selection of functional hardware/software components and corresponding software products across categories of functional and non-functional requirements.

Figure 4:
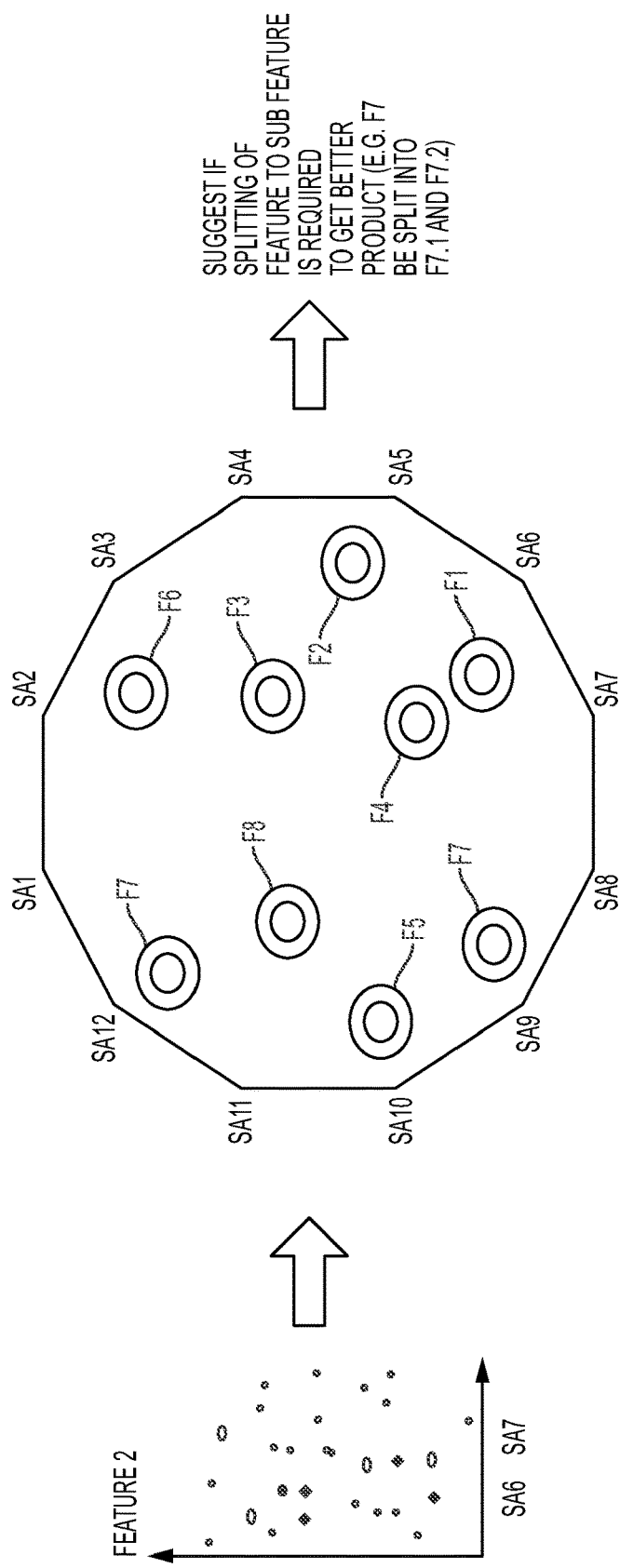
FIG. 4 illustrates execution of a step of FIG. 2 for evaluating currently available software applications with respect to associations between each required feature and a plurality of hardware based data repositories, in accordance with embodiments of the present invention.

FIG. 4 illustrates execution of step 208 of FIG. 2 for evaluating currently available software applications with respect to associations between each required feature and a plurality of hardware based data repositories, in accordance with embodiments of the present invention. Execution of step 208 results in the identification of salient features via usage of context aware syndication software by generating evaluation code for evaluating all available software applications SA1 . . . SA12 with respect to associations with respect to required functional software features F1 . . . F8 and associated data repositories. Each determined association is recorded. The identification of salient features via usage of context aware syndication software is determined as follows:

The following Euclidian distance equations represent:

$d_{proximity}(c^i, c^j)$=Eucliedian distance between $c^i, c^j$ $d_{affinity}(c^i, c^j)$=Eucliedian distance between $c^i, c^j$ Therefore, normalized the values for $d_{proximity}$ and $d_{affinity}$ to [0,1] are determined and a dissimilarity between the pair of data values are as follows:

$$d(x^i, x^j) = \frac{d_{proximity}(c^i, c^j)}{1 + \theta \cdot d_{affinity}(c^i, c^j)}$$

θ represents a constant and a maximum dimensionality allowed for the above coloring problem is set as 4, therefore θ is set at 3 for enabling a higher degree of freedom required to resolve the problem of dimensionality and therefore, θ=3. Based on the above calculations, it may be determined that a data value is salient if d $(c^i, c^j)$ is very high. Therefore, for every feature a query is performed to search for the K most similar data values (i.e., if the most similar data values are different from $c^i$, then all data values are highly different to $c^i$). Therefore, a syndication guided value of $c^i$ is defined as follows:

$$S^i = 1 - \exp\left\{-\frac{1}{K}\sum_{k=1}^{K} d(c^i, c^j)\right\}$$

The above process identifies specialized software products that differentiate with respect to a specified set of requirements in scope for all evaluation parameters.

Figure 5:
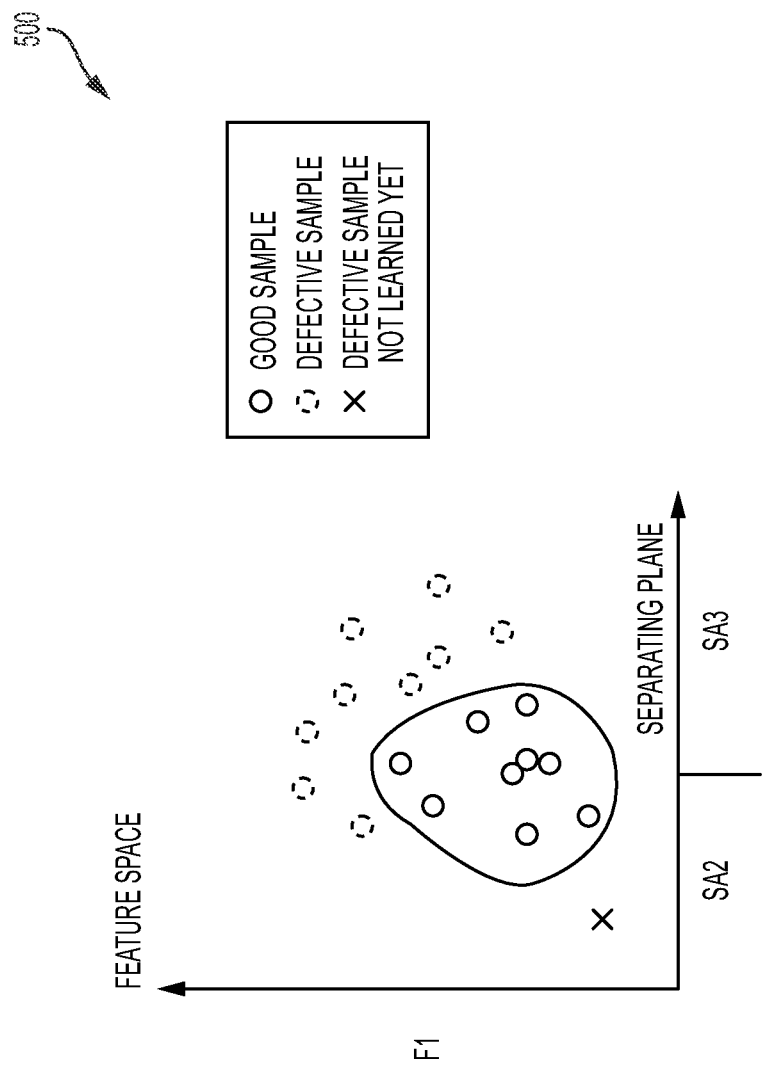
FIG. 5 illustrates execution of a step of FIG. 2 for generating a list of validated software applications associated with each required feature, in accordance with embodiments of the present invention.

FIG. 5 illustrates execution of step 210 of FIG. 2 for generating a list of validated software applications associated with each required feature, in accordance with embodiments of the present invention. Execution of step 208 results in generating feature translation learning software code. Additionally, a list of validated software applications (i.e., which have delivered selected features and associated dimensions successfully and consistently) is generated such that a sampling strategy 500 is applied to identify software and data comprising a defective or a good sample. A shortlist sample application and data may be enabled to apply learning code from the sample application to a complete data set thereby modifying a strength of a software application fitment to a feature based on the learning code.

An unsupervised feature learning algorithm may be enabled to discover software related features in unlabeled data. Additionally, the features may be learned from a representative set of data values sampled from the dataset and the features may be applied across the population. Therefore, buckets of X are retrieved and a function is defined as follows:

$$f: R^N \rightarrow R^K$$

The above function maps a new vector $c^i$ to a new feature vector by K features and an auto encoder is executed as a symmetrical neural network that is used to learn software features of the dataset in an unsupervised manner. The auto encoder is executed by minimizing a reconstruction error between input data at the encoding layer and its reconstruction at the decoding layer thereby enabling the following equation:

$$\alpha^i = f(x) = g(W_1 c^i + b_1)$$

$W_1 \in R^{K \times N}$ comprises a weight matrix with K features, $b_1 \in R^K$ comprises an encoding bias, and $g(x)=1/(1+e^{-X})$ comprises a logistic sigmoid function.

Additionally, a vector may be decoded using a separate linear decoding matrix as follows:

$$Z^i = (W_2^T \alpha + b_2)$$

$W_2 \in R^{K \times N}$ comprises a weight matrix with K features and $b_2 \in R^K$ comprises an encoding bias.

Therefore, categories of software requirements are identified with respect to a logical group of code to be sourced from one target software product.

Figure 6:
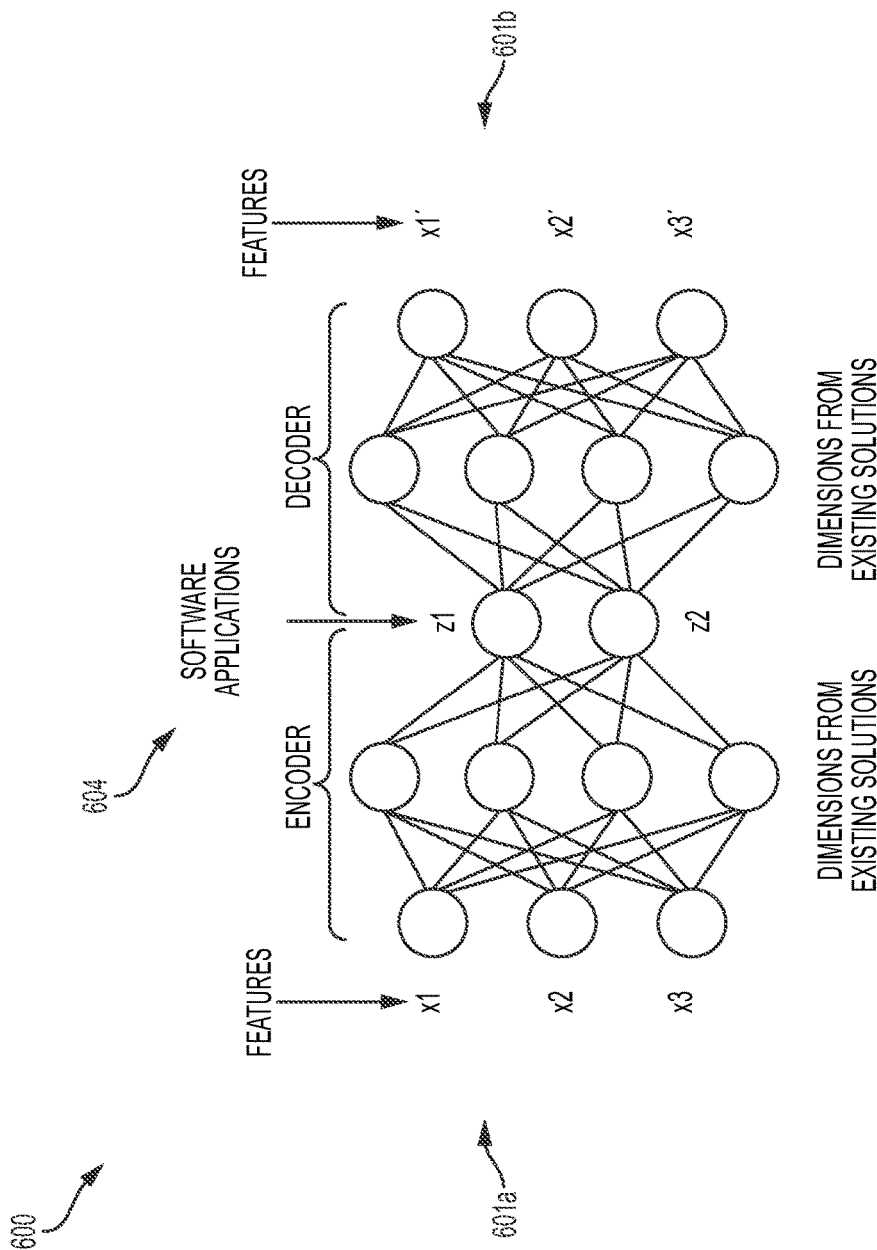
FIG. 6 illustrates execution of a step of FIG. 2 for generating identification software code 600, in accordance with embodiments of the present invention

FIG. 6 illustrates execution of step 214 of FIG. 2 for generating identification software code 600, in accordance with embodiments of the present invention. Execution of step 214 results in classifying a hardware framework for mapping features 601a and 601b to software applications 604 by generating intelligence based code for identifying highly successfully executed software applications for each feature by applying an auto encoder learning technique to remove any error in the selection process, such that:
1. Each required feature is associated to shortlisted software applications via different dimensions.
2. A software application's reverse association to a feature is discovered.

Feature extractor code within a data set is generated by minimizing a cost function. A first term in a reconstruction equation comprises an error term and a second term comprises a regularization term (e.g., a weight decay term in a neural network) such that the following selection model is generated as follows:

$$J(X, Z)_i = \frac{1}{2} \sum_{i=1}^{m} \|c^i - z^i\|^2 + \frac{S^i}{2} \cdot \|W\|^2$$

X is comprises training data, Z comprises reconstructed data, and α comprises a hidden value of the auto encoders thereby generating the most fitted values trained over an explicit dataset such that corresponding features are used to build a J-score. Additionally (to achieve further refinement), the learning rules may be employed using sparse auto encoder learning code to minimize the reconstruction error with a sparsity constraint (i.e., a sparse auto encoder). The above process is enabled via Kullback-Leibler divergence using backpropagation and limited-memory Broyden-Fletcher-Goldfarb-Shanno (L-BFGS) to train the model.

FIG. 7 illustrates execution of step 218 of FIG. 2 for generating software operational solution 700, in accordance with embodiments of the present invention. Execution of step 218 results in finalizing software applications for software operational solution 700. Recommendations for a highest fitment software application for each feature are generated by applying syndication over a trained data set to refine fitment scores such that:
1. Fitment scores are refined by applying syndication over trained data.
2. An ordered set of depthfit is created to bring recommended software applications to the top of a queue.
3. Flexibility for decision making is provided such that any fine tuning of dimensions may provide updated recommendations for software applications.

DepthFit fitment code is generated via usage of syndication over a trained data set which has been refined to $\hat{j}$ as:

$$P_i = \hat{J}(X, Z)_i \forall \hat{J}_i \in \left\{ J(X, Z)_i + \beta \sum_{j=1}^{K} KL\left(\frac{1}{m} \sum_{i=1}^{m} \lceil c^{i} \rceil \right) \right\}$$

The above equation represents an ordered set to select a best software product according to a depthFit assortment as follows:

$$\{(P_{depth})\} \leftarrow \{P_i :: \exists P \leftarrow (D_H \cup D_M \cup D_L)_i | \{D_H, D_L, D_M\} \in \{G\}\}$$

Figure 8:
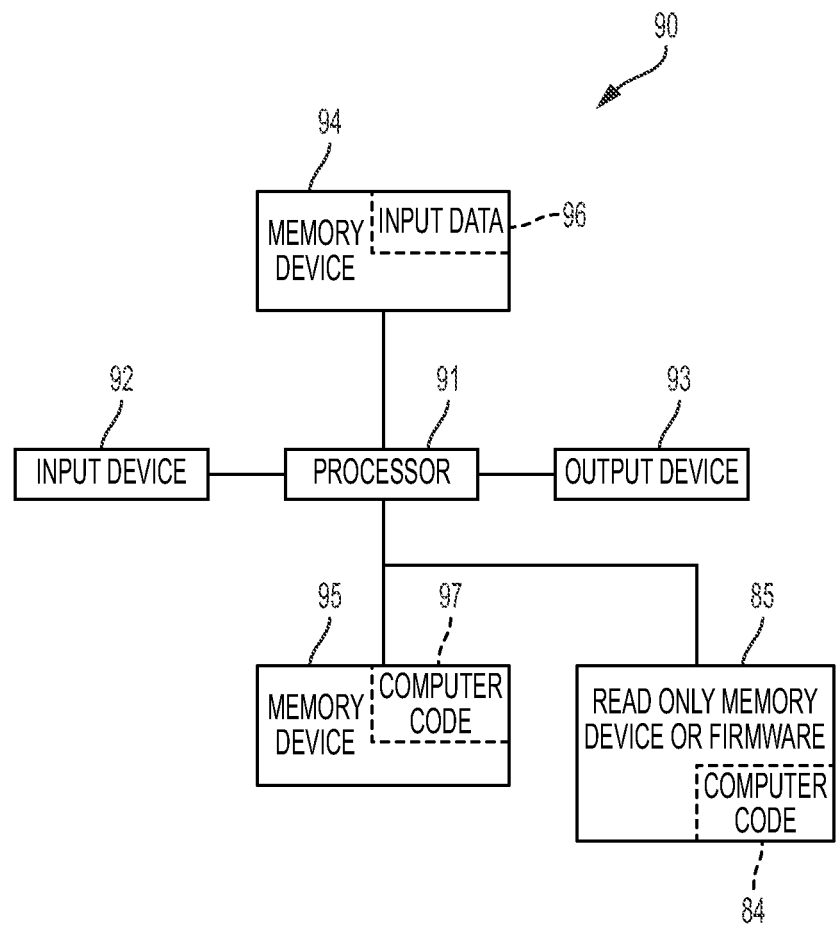
FIG. 8 illustrates a computer system used by the system of FIG. 1 for enabling a process for improving hardware device operation by generating evaluation and modification software code for validating software applications and a hardware device, in accordance with embodiments of the present invention.

FIG. 8 illustrates a computer system 90 (e.g., server 23, database system 21, and hardware device 14 of FIG. 1) used by or comprised by the system of FIG. 1 for improving hardware device operation by generating evaluation and modification software code for validating software applications and a hardware device, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 8 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2 for improving hardware device operation by generating evaluation and modification software code for validating software applications and a hardware device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware device operation by generating evaluation and modification software code for validating software applications and a hardware device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware device operation by generating evaluation and modification software code for validating software applications and a hardware device. In another embodiment, the invention provides a business method that performs the process steps of the invention on a subscription, advertising, and/or fee basis. That is, a service supplier, such as a Solution Integrator, could offer to enable a process for improving hardware device operation by generating evaluation and modification software code for validating software applications and a hardware device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated information technology (IT) system operational improvement method comprising:
  identifying, by a processor of a hardware device of an IT system, a set of pre-tested software applications associated with requirements of processes executed by said hardware device with respect to said IT system, wherein said requirements are comprised by metadata, and wherein said set of pre-tested software applications have been pre-tested for accurate functionality with respect to performing said processes executed by said hardware device with respect to said IT system;
  generating, by said processor based on results of said identifying, a list of currently available software applications of said set of pre-tested software applications associated with required features associated with software based solutions for modifying said set of pre-tested software applications such that said currently available software applications are configured to provide and execute said required features;
  generating, by said processor based on said software based solutions, evaluation code for evaluating said currently available software applications with respect to associations between each required feature of said required features and a plurality of hardware implemented data repositories comprising information describing each required feature;
  generating, by said processor based on results of executing said evaluation code, a list of validated software applications of said currently available software applications, said validated software applications associated with each said required feature being executed by applying Euclidean distance software code;
  generating, by said processor based on results of said executing said evaluation code, a list of short listed software applications of said currently available software applications, said short listed software applications have been verified via a sampling software test determined by feature translation learning code associated with each said required feature being executed;
  generating, by said processor, identification software code enabling an automated encoder learning process applying a feature learning technique for identifying said validated software applications;
  identifying, by said processor, a software operational solution of said software based solutions, said software operational solution comprising all available features of said required features associated with said validated software applications and comprising a greater number of features than any other software application of said validated software applications;
  generating, by said processor based on said software operational solution, modification code for modifying said validated software applications; and
  executing, by said processor, said modification code resulting in improved operation of said validated software applications and said hardware device.

2. The method of claim 1, further comprising:
  generating, by said processor, executable code associated with said software operational solution;
  executing, by said processor, said executable code resulting in modifying said validated software applications with respect to improving an efficiency and accuracy of said validated software applications;
  generating, by said processor in response to said executing, additional executable code; and
  combining, by said processor, said additional executable with said validated software applications resulting in said improving said efficiency and accuracy of said validated software applications.

3. The method of claim 1, wherein said generating said evaluation code comprises:
  evaluating software applications of said validated software applications that have been executed successfully at a previous point in time.

4. The method of claim 1, further comprising:
  recording by said processor, associations between each of said validated software applications.

5. The method of claim 1, further comprising:
  generating, by said processor based on software based solutions, sampling software code by applying a sampling technique for enabling said hardware device to execute self learning software code with respect to a plurality of database systems.

6. The method of claim 1, further comprising:
associating, by said processor, said validated software applications to differing dimensions of specialized memory devices.

7. The method of claim 1, wherein said improved operation of said validated software applications and said hardware device comprises an improved processing speed for said processor.

8. The method of claim 1, wherein said improved operation of said validated software applications and said hardware device comprises an improved memory structure of said hardware device, and wherein said improved memory structure enables an improved access speed for accessing data within said improved memory structure via an internal layered structure of said improved memory structure.

9. The method of claim 1, further comprising:
providing at least one support service for at least one of creating, integrating, hosting, maintaining, and deploying computer-readable code in the hardware device, said code being executed by the processor to implement: said identifying said set of pre-tested software applications, said generating said list of currently available software applications, said generating said evaluation code, said generating said list of validated software applications, said generating said list of short listed software applications, said generating aid identification software code, said identifying said software operational solution, said generating said modification code, and said executing.

10. A computer program product, comprising a computer readable hardware storage device storing a computer readable program code, said computer readable program code comprising an algorithm that when executed by a processor of a hardware device of an information technology (IT) system implements an automated IT system operational improvement method, said method comprising:
identifying, by said processor, a set of pre-tested software applications associated with requirements of processes executed by said hardware device with respect to said IT system, wherein said requirements are comprised by metadata, and wherein said set of pre-tested software applications have been pre-tested for accurate functionality with respect to performing said processes executed by said hardware device with respect to said IT system;
generating, by said processor based on results of said identifying, a list of currently available software applications of said set of pre-tested software applications associated with required features associated with software based solutions for modifying said set of pre-tested software applications such that said currently available software applications are configured to provide and execute said required features;
generating, by said processor based on said software based solutions, evaluation code for evaluating said currently available software applications with respect to associations between each required feature of said required features and a plurality of hardware implemented data repositories comprising information describing each required feature;
generating, by said processor based on results of executing said evaluation code, a list of validated software applications of said currently available software applications, said validated software applications associated with each said required feature being executed by applying Euclidean distance software code;
generating, by said processor based on results of said executing said evaluation code, a list of short listed software applications of said currently available software applications, said short listed software applications have been verified via a sampling software test determined by feature translation learning code associated with each said required feature being executed;
generating, by said processor, identification software code enabling an automated encoder learning process applying a feature learning technique for identifying said validated software applications;
identifying, by said processor, a software operational solution of said software based solutions, said software operational solution comprising all available features of said required features associated with said validated software applications and comprising a greater number of features than any other software application of said validated software applications;
generating, by said processor based on said software operational solution, modification code for modifying said validated software applications; and
executing, by said processor, said modification code resulting in improved operation of said validated software applications and said hardware device.

11. The computer program product of claim 10, wherein said method further comprises:
generating, by said processor, executable code associated with said software operational solution;
executing, by said processor, said executable code resulting in modifying said validated software applications with respect to improving an efficiency and accuracy of said validated software applications;
generating, by said processor in response to said executing, additional executable code; and
combining, by said processor, said additional executable with said validated software applications resulting in said improving said efficiency and accuracy of said validated software applications.

12. The computer program product of claim 10, wherein said generating said evaluation code comprises:
evaluating software applications of said validated software applications that have been executed successfully at a previous point in time.

13. The computer program product of claim 10, wherein said method further comprises:
recording by said processor, associations between each of said validated software applications.

14. The computer program product of claim 10, wherein said method further comprises:
generating, by said processor based on software based solutions, sampling software code by applying a sampling technique for enabling said hardware device to execute self learning software code with respect to a plurality of database systems.

15. The computer program product of claim 10, wherein said method further comprises:
associating, by said processor, said validated software applications to differing dimensions of specialized memory devices.

16. The computer program product of claim 10, wherein said improved operation of said validated software applications and said hardware device comprises an improved processing speed for said processor.

17. The computer program product of claim 10, wherein said improved operation of said validated software applications and said hardware device comprises an improved memory structure of said hardware device, and wherein said improved memory structure enables an improved access speed for accessing data within said improved memory structure via an internal layered structure of said improved memory structure.

18. A hardware device of an information technology (IT) system comprising a processor coupled to a computer-readable memory unit in the IT system, said memory unit comprising instructions that when executed by the processor implements an automated IT system operational improvement method comprising:

identifying, by said processor, a set of pre-tested software applications associated with requirements of processes executed by said hardware device with respect to said IT system, wherein said requirements are comprised by metadata, and wherein said set of pre-tested software applications have been pre-tested for accurate functionality with respect to performing said processes executed by said hardware device with respect to said IT system;

generating, by said processor based on results of said identifying, a list of currently available software applications of said set of pre-tested software applications associated with required features associated with software based solutions for modifying said set of pre-tested software applications such that said currently available software applications are configured to provide and execute said required features;

generating, by said processor based on said software based solutions, evaluation code for evaluating said currently available software applications with respect to associations between each required feature of said required features and a plurality of hardware implemented data repositories comprising information describing each required feature;

generating, by said processor based on results of executing said evaluation code, a list of validated software applications of said currently available software applications, said validated software applications associated with each said required feature being executed by applying Euclidean distance software code;

generating, by said processor based on results of said executing said evaluation code, a list of short listed software applications of said currently available software applications, said short listed software applications have been verified via a sampling software test determined by feature translation learning code associated with each said required feature being executed;

generating, by said processor, identification software code enabling an automated encoder learning process applying a feature learning technique for identifying said validated software applications;

identifying, by said processor, a software operational solution of said software based solutions, said software operational solution comprising all available features of said required features associated with said validated software applications and comprising a greater number of features than any other software application of said validated software applications;

generating, by said processor based on said software operational solution, modification code for modifying said validated software applications; and executing, by said processor, said modification code resulting in improved operation of said validated software applications and said hardware device.

19. The hardware device of claim 18, wherein said method further comprises:

generating, by said processor, executable code associated with said software operational solution;

executing, by said processor, said executable code resulting in modifying said validated software applications with respect to improving an efficiency and accuracy of said validated software applications;

generating, by said processor in response to said executing, additional executable code; and combining, by said processor, said additional executable with said validated software applications resulting in said improving said efficiency and accuracy of said validated software applications.

20. The hardware device of claim 18, wherein said generating said evaluation code comprises:

evaluating software applications of said validated software applications that have been executed successfully at a previous point in time.

\* \* \* \* \*